United States Patent
Chelniak et al.

(10) Patent No.: US 8,825,559 B2
(45) Date of Patent: Sep. 2, 2014

(54) METHODS, APPARATUS, SYSTEMS AND COMPUTER READABLE MEDIUMS FOR USE IN GENERATING A CUSTOMS EXPORT DOCUMENT

(71) Applicants: Hans Chelniak, Hockenheim (DE); Torsten Stolz, Mannheim (DE)

(72) Inventors: Hans Chelniak, Hockenheim (DE); Torsten Stolz, Mannheim (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/855,481

(22) Filed: Apr. 2, 2013

(65) Prior Publication Data

US 2013/0232088 A1  Sep. 5, 2013

Related U.S. Application Data

(63) Continuation of application No. 12/715,866, filed on Mar. 2, 2010, now Pat. No. 8,417,646.

(51) Int. Cl.
*G06Q 30/00* (2012.01)
*G06Q 10/08* (2012.01)

(52) U.S. Cl.
CPC .................. *G06Q 10/083* (2013.01)
USPC ............. 705/330; 705/28; 705/34; 705/334; 705/336

(58) Field of Classification Search
CPC ................................ G06Q 10/0835
USPC ................ 705/28, 34, 330, 334, 336
See application file for complete search history.

(56) References Cited

U.S. PATENT DOCUMENTS

| | | |
|---|---|---|
| 5,926,822 A | 7/1999 | Garman |
| 6,406,249 B1 | 6/2002 | McAdams et al. |
| 6,567,789 B1 | 5/2003 | Baker |
| 7,725,406 B2 | 5/2010 | Black et al. |
| 7,895,092 B2 | 2/2011 | Amling et al. |
| 2001/0027463 A1 | 10/2001 | Kobayashi |

(Continued)

FOREIGN PATENT DOCUMENTS

| | | |
|---|---|---|
| EP | 1 460 570 A1 | 9/2004 |
| WO | 99/34272 A2 | 7/1999 |

OTHER PUBLICATIONS

"Customs Procedures with Economic Impact", Mar. 27, 2007, retrieved Oct. 27, 2011, retrieved from http://help.sap.com/saphelp_gts71/helpdata/en/0b/333a426ea5b26be10000000a155106/content.h, 3pgs.

(Continued)

*Primary Examiner* — F. Zeender
*Assistant Examiner* — Hunter Wilder
(74) *Attorney, Agent, or Firm* — Buckley, Maschoff & Talwalkar LLC

(57) ABSTRACT

According to some embodiments, methods, apparatus, systems and/or computer readable mediums are provided. According to some embodiments, a method includes generating at least one shipment request data object based at least in part on at least one outbound delivery data object; generating at least one freight unit data object based at least in part on the at least one shipment request data object; generating at least one shipment data object based at least in part on the at least one freight unit data object; generating at least one invoice data object based at least in part on the at least one shipment data object; and generating at least one customs export document based at least in part on the at least one invoice.

32 Claims, 5 Drawing Sheets

(56) References Cited

U.S. PATENT DOCUMENTS

| | | | |
|---|---|---|---|
| 2002/0055963 | A1 | 5/2002 | Kanemasa et al. |
| 2003/0004735 | A1 | 1/2003 | Dutta et al. |
| 2003/0040947 | A1 | 2/2003 | Alie et al. |
| 2003/0069831 | A1 | 4/2003 | Le et al. |
| 2003/0144863 | A1 | 7/2003 | Liu |
| 2003/0144971 | A1 | 7/2003 | Das et al. |
| 2003/0172007 | A1 | 9/2003 | Helmolt et al. |
| 2003/0191652 | A1 | 10/2003 | Li et al. |
| 2004/0193435 | A1 | 9/2004 | Fang |
| 2005/0004894 | A1 | 1/2005 | Uy et al. |
| 2005/0182650 | A1 | 8/2005 | Maddox, Jr. et al. |
| 2005/0222853 | A1 | 10/2005 | Black et al. |
| 2006/0085201 | A1 | 4/2006 | Sultan |
| 2006/0241985 | A1 | 10/2006 | Arnold et al. |
| 2007/0265874 | A1* | 11/2007 | Gardner et al. ............ 705/1 |
| 2008/0114643 | A1 | 5/2008 | Milovina-Meyer et al. |
| 2009/0327105 | A1* | 12/2009 | Moussa et al. ............ 705/29 |
| 2011/0218898 | A1 | 9/2011 | Chelniak et al. |

OTHER PUBLICATIONS

DutyCalc Data Systems, "Drawback.net 2007", Jul. 2007, 4pgs., available at http://dutycalc.com/dnld/archived_dnIds_2007brochures/dutycalc-mainbrochureDRAWBACK.NET2007.pdf.

"Inward Processing, Guidelines for Traders", Jul. 2008, Revenue, (cover 1pg. + pp. 2-38, 38 pages total), available at http://www.revenue.ie./en/customs/leaflets/ip-guidelines2008.pdf.

EUR-Lex-31992R2913, "Council Regulation (EEC) No. 2913/92 of Oct. 12, 1992 establishing the Community Customs Code", Official Journal L 302, Oct. 19, 1992, retrieved Oct. 17, 2011, download from http://eur-lex-europa.eu/LexUriServ/LexUriServ.do?uri=CELEX:31992R2913:EN:HTML, (pp. 1-56, 56 pages total).

Commission, Guidelines concerning Title III 'Customs procedures with economic impact' of Commission Regulation (EEC) N0 2454/93 of Jul. 2, 1993 laying down provisions of the implementation of Council Regulation (EEC) No. 2913/92 establishing the Community Customs Code, Sep. 24, 2001, Official Journal of the European Communities, 2001/C269/1-50 ISSN: 0378-6986, 50 pages.

Luc De Wulf and Jose B. Sokol, "Customs Modernization Handbook", 2005, Copyright 2005 The International Bank for Reconstruction and Development / The World Bank, (cover 1 + pp. 215-241, 29 pages total).

EUR-Lex-31993R2454-EN, "Commission Regulation (EEC) No. 2454/93 of Jul. 2, 1993 laying down provisions for the implementation of Council Regulation (EEC) No. 2913/92 establishing the Community Customs Code", Official Journal L 253, Nov. 10, 1993, retrieved Oct. 17, 2011, download from http:eur-lex.europa.eu/LexUriServ/LexUriServ.do?uri=CELEX:31993R2454:EN:HTML, (pp. 1-228, 228 pages total).

* cited by examiner

METHODS, APPARATUS, SYSTEMS AND COMPUTER READABLE MEDIUMS FOR USE IN GENERATING A CUSTOMS EXPORT DOCUMENT

CROSS REFERENCE TO RELATED APPLICATION

This is a continuation application of co-pending prior U.S. patent application Ser. No. 12/715,866, filed Mar. 2, 2010.

FIELD

Some embodiments of the present invention relate to methods, apparatus, systems and/or computer readable mediums for use in association with customs related activities. In particular, some embodiments relate to systems, methods, apparatus and/or computer readable mediums for use in association with generating customs export documents.

BACKGROUND

Exporters are often required to provide a customs export document prior to exporting products out of a trade territory (e.g., a territory of, and/or within, a country or group of countries). The customs export document is often transmitted to a customs authority for the trade territory using an electronic system. See for example, the Automated Export System (AES), which is commonly used in Germany.

The customs export document is often generated based on information from an enterprise resource planning (ERP) system. For example, an ERP system may generate an outbound delivery data object to indicate that product(s), are ready to be delivered to a customer (e.g., created in response to a sales order). This will result in making an outbound delivery to the customer, e.g., a delivery leaving the factory. An invoice (for the product(s) to be delivered to the customer) may be generated from the outbound delivery data object and a customs export document may be generated based on such invoice.

DETAILED DESCRIPTION

In a prior art method for generating a customs export document based on information from an enterprise resource planning (ERP) system, a separate customs export document is generated for each data delivery object.

It has been determined that it may be advantageous to include product(s) from more than one delivery object on a single customs export document, while still including only one customer on the customs export document. In situations where each delivery data object includes only one type of product, it may nonetheless be advantageous to have more than one product on a single customs export document, while including only one customer on the customs export document. It may also be advantageous to have more than one delivery on a single customs export document, while including only one customer on the customs export document. In some embodiments, one or more of these consolidations may greatly reduce the number of customs export documents that are required to export a shipment of products to the customer.

It has also been determined that it may be advantageous to facilitate determination of whether a shipment has been cleared for export.

Figure 1:
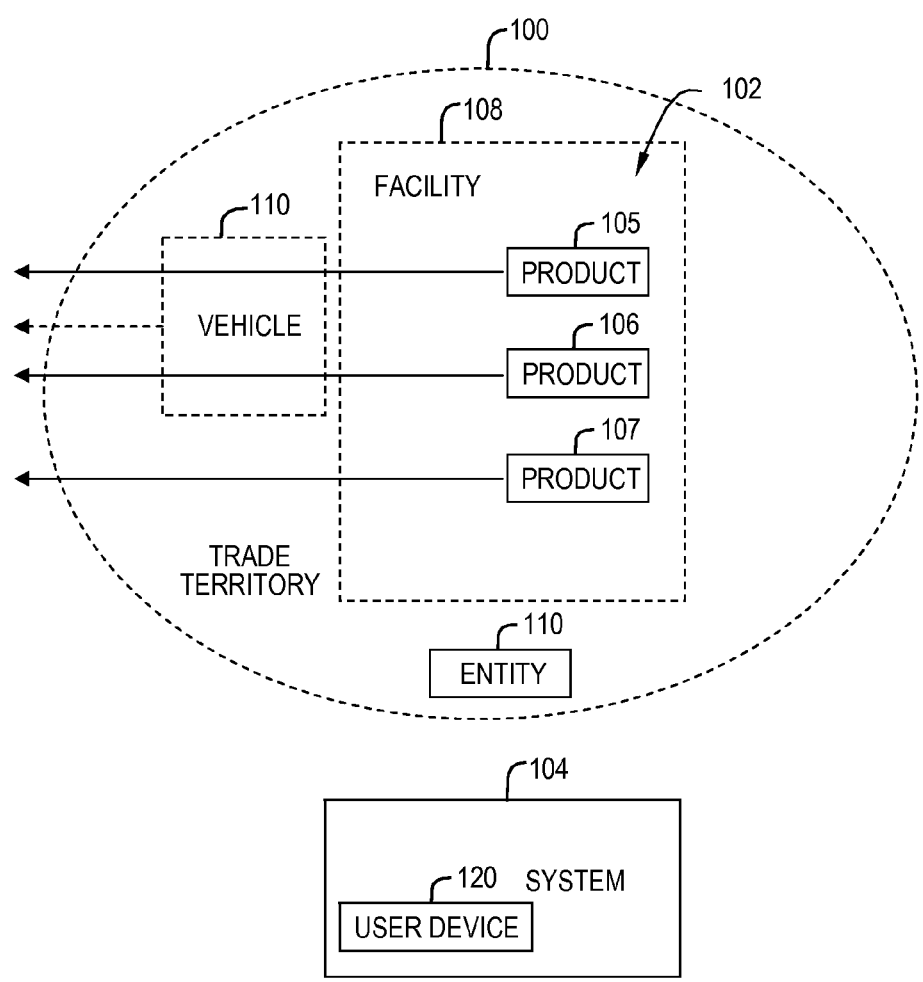
FIG. 1 is a schematic block diagram of a system that may be used in association with generating customs export documents, according to some embodiments.

FIG. 1 is a schematic block diagram of a trade territory 100 out of which a plurality of products 102 are to be exported and a system 104 that may be used in generating customs export documents, in accordance with some embodiments.

The trade territory 100 may comprise any type of trade territory. In some embodiments, the trade territory 100 comprises some and/or all territory of a single country (e.g., the United States of America). In some other embodiments, the trade territory 100 comprises some or all territory of a plurality of countries (e.g., the European Union).

The plurality of products 102 may comprise any type(s) of product(s). In some embodiments, the plurality of products 102 comprise two or more different types of products, such as for example, a product of a first type, represented by product 105, a product of a second type, represented by a product 106, and a product of a third type, represented by a product 107.

The plurality of products 102 may be exported from a facility 108. Prior to being exported, the plurality of products 102 may be produced at and/or delivered to the facility 108. The facility 108, which may comprise a manufacturing facility and/or any other type of manufacturing or distribution related facility (e.g., warehouse) may be owned, operated and/or otherwise associated with an entity 110.

In some embodiments, two or more of the products to be exported out of the trade territory 100 may be combined into a single shipment. In the illustrated embodiment, for example, two or more of the products may be combined into a single shipment transported by a vehicle 110 out of the trade territory.

In some embodiments, the system provides automatic consolidation of deliveries into a shipment. In some embodiments, the delivery includes more than one product per delivery. In some embodiments, a product is found in more than one delivery.

In some embodiments, the system 104 provides a user with a capability to control (to at least some degree) whether particular deliveries or types of deliveries are to be combined into single shipment. In some embodiments, this capability is provided via a provision of one or more editable parameters or other tools in a graphical or other type of user interface. In some embodiments, the capability is provide via a standard split screen criteria tool in a graphical user interface that may be employed by a user to input data that may be used by the system 104 in providing such control.

The system 104 may be used in generating one or more customs export document prior to exporting the products 102 out of the trade territory. The system 104 may comprise any type(s) of system and may be disposed inside and/or outside of the facility 108 and/or trade territory 100. In some embodiments, the system 104 (or portion(s) thereof) has an architecture that is the same as and/or similar to the architecture of apparatus 500 (or portion(s) thereof) of FIG. 5. In some embodiments, the system 104 may be owned, operated and/or otherwise associated with the entity 110.

In some embodiments, the system 104 includes a user device 120, such as, for example, a PC, workstation, set-top device, or mobile computer. The user device 120 may, for example, transmit and/or receive data such as text, graphics, videos, audio content, and/or tabular content from one or more sources within the system 104 and/or external to the system 104. The user device 120 may be located in proximity with and/or remote from one or more other portions of the system 104.

In some embodiments, the user device 120 includes a display screen (or other output device) and a mouse (or other input device) (none of which is separately shown) to allow the user device to provide data to and/or receive data from a user. In some embodiments, the user device 120 executes a browser program to transmit and/or receive data via a computer network, e.g., internet. In some embodiments, the user device 120 (or portion(s) thereof) has an architecture that is the same as and/or similar to the architecture of apparatus 500 (or portion(s) thereof) of FIG. 5.

In some embodiments, the user device 120 is used to provide a user interface, for example, but not limited to one, some or all of the user interfaces described herein.

Figure 2:
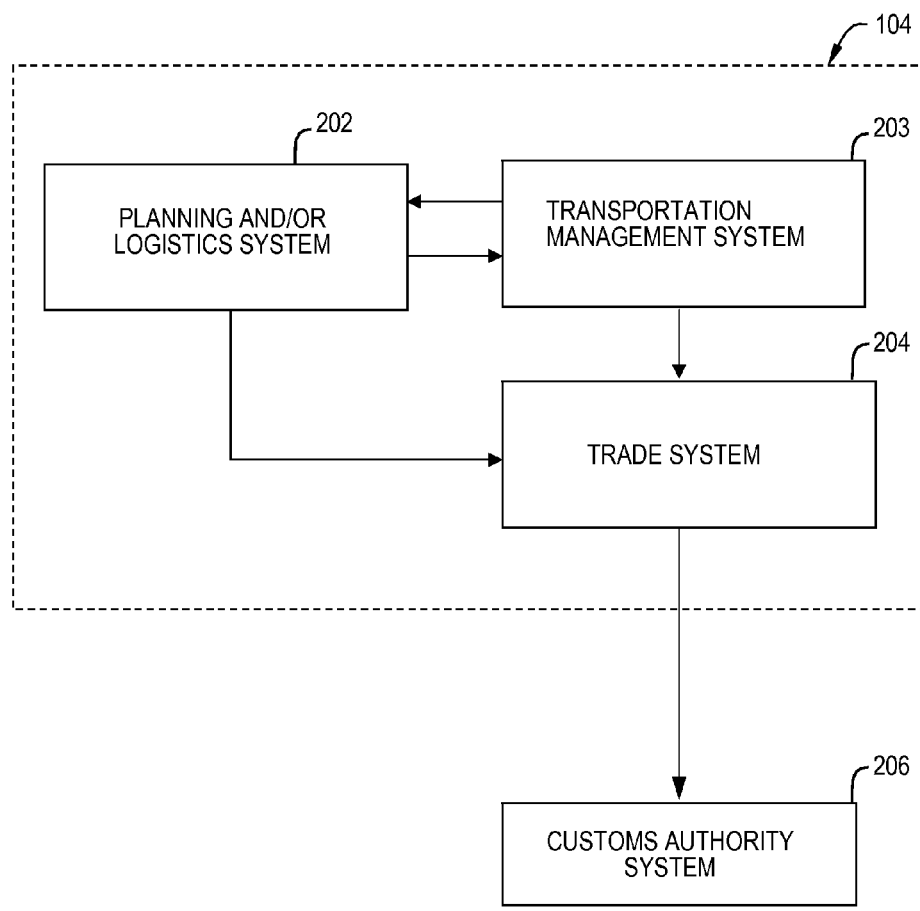
FIG. 2 is a schematic block diagram of a system that may be used in generating one or more customs export document, according to some embodiments.

FIG. 2 is a schematic block diagram of the system 104, according to some embodiments. Referring to FIG. 2, the system 104 may comprise a planning and/or logistics system 202, a transportation management system 203 and a trade system 204. The planning and/or logistics system 202 and the transportation management system 203 may exchange data with each other related to production, sale and/or delivery of goods and services. These systems 202, 203 may also provide data to the trade system 204. The trade system 204, may facilitate compliance with regulation including creation of documentation. In some embodiments, two or more of the planning and/or logistics system 202, the transportation management system 203 and the trade system 204 are combined in one system.

In some embodiments, the planning and/or logistics system 202 comprises an enterprise resource planning (ERP) system, for example an ERP system provided by SAP AG headquartered in Walldorf, Germany. In some embodiments, the planning and/or logistics system 202 is a supply chain management system. In some embodiments, the planning and/or logistics system 202 (or portion(s) thereof) has an architecture that is the same as and/or similar to the architecture of apparatus 500 (or portion(s) thereof) of FIG. 5.

In some embodiments, the transportation management system 203 comprises a system such as, for example, TM 7.0, also provided by SAP AG. In some embodiments, the transportation management system 203 (or portion(s) thereof) has an architecture that is the same as and/or similar to the architecture of apparatus 500 (or portion(s) thereof) of FIG. 5.

The trade system 204 may comprise a Global Trade System (GTS), such as for example, GTS 8.0, also provided by SAP AG. In some embodiments, the trade system 204 (or portion(s) thereof) has an architecture that is the same as and/or similar to the architecture of apparatus 500 (or portion(s) thereof) of FIG. 5.

In some embodiments, the transportation management system 203 (which may comprise SAP TM 7.0) initiates generation of invoices (sometimes referred to as billing documents) in the planning and/or logistics system 202 (which may comprises SAP ERP 6.0) for deliveries that are transferred from the planning and/or logistics system 202 and processed further in the transportation management system 203. The trade system 204 may then carry out export processing based on these invoices.

In some embodiments, one or both of two advantages are provided by the system 104, where a first advantage is the advantage of using the transportation management system 203 integration with the planning and/or logistics system 202 and the trade system 204, and a second advantage is automated shipment consolidation.

In some embodiments, the system 104 communicates one or more customs export documents to a customs authority system 206 operated by and/or associated with a customs authority of the trade territory.

In some embodiments the trade system 204 and/or the transportation management system 203 interact with customs authorities to facilitate pre-clearance whereby a vehicle arrives at the border, often with a sealed load, and a pre-clearance to cross. In some embodiments, one of the possible efficiencies of such a system would be defeated if the vehicle arrived prior to clearance being issued.

In some embodiments, it is possible to retrieve the release status of export transactions assigned by the customs authorities directly from transportation management system 203 and/or the trade system 204.

Figure 3:
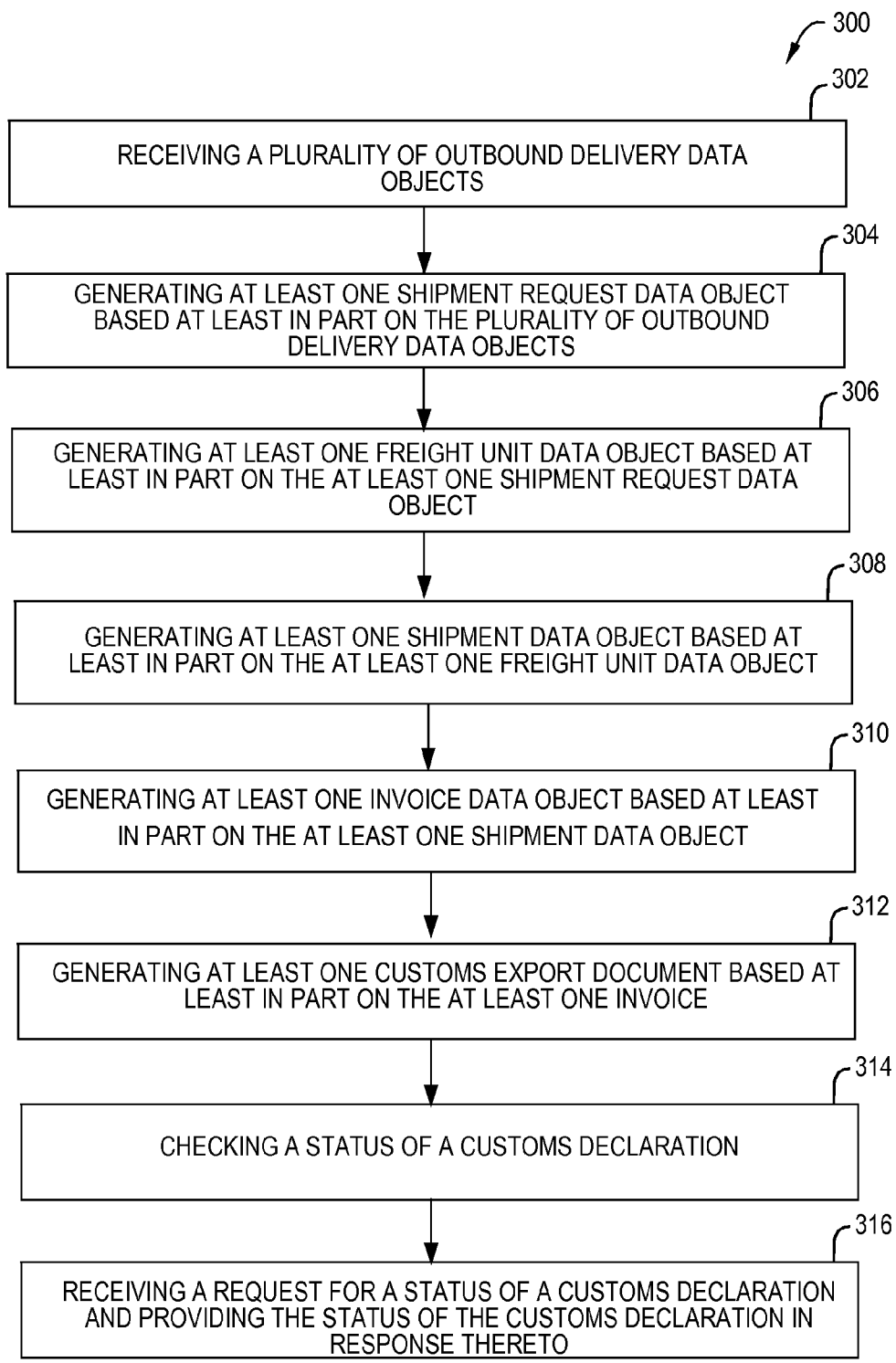
FIG. 3 is a flow chart that illustrates a method according to some embodiments.

FIG. 3 is a flow chart that illustrates a method 300 according to some embodiments. In some embodiments, the method 300, or one or more portions thereof, may be performed by the system 104, or one or more portions thereof, and/or by one or more other systems. For that matter, unless stated otherwise, any method disclosed herein, or one or more portions thereof, may be performed by the system 104, or one or more portions thereof, and/or by one or more other systems.

In accordance with some embodiments, the method 300 may be used generating one or more customs export document.

The method 300 is not limited to the order shown in the flow chart. Rather, embodiments of the method 300 may be performed in any order that is practicable. For that matter, unless stated otherwise, any method disclosed herein may be performed in any order that is practicable.

Referring to FIGS. 3A-3B, at 302, the method may include receiving a plurality of outbound delivery data objects. In some embodiments, each of the plurality of outbound delivery data objects is associated with product(s) and a customer and indicates that the associated product(s) are ready to be delivered to the associated customer.

At 304, the method may further include generating at least one shipment request data object based at least in part on the plurality of outbound delivery data objects.

At 306, the method may further include generating at least one freight unit data object based at least in part on the at least one shipment request data object.

At 308, the method may further include generating at least one shipment data object based at least in part on the at least one freight unit data object.

At 310, the method may further include generating at least one invoice data object based at least in part on the at least one shipment data object.

At 312, the method may further include generating at least one customs export document based at least in part on the at least one invoice. In some embodiments, at least one of the at least one customs export document identifies more than one product that is to be delivered to a customer.

As stated above, it may be advantageous to include more than one product on a customs export document (while still including only one customer on the customs export document). In some embodiments, this may reduce the number of customs export documents that are required to export a shipment of products to the customer. Reducing the number of documents may reduce the amount of time needed to generate the customs export documents for a shipment and/or may reduce the amount of communication (e.g., between the logistics system 202 and the trade system 203) needed to generate the customs export documents for a shipment. In some embodiments, reducing the number of customs export documents may also reduce costs because a customs authority may charge for each customs export document. In addition, in some embodiments, the likelihood of a pre-clearance being issued for a shipment increases if the number of customs documents related to the shipment decreases.

At 314, the method may further comprise using the system 104 to manually check a status of a customs declaration (e.g., from the transportation management system 203). A shipment status may then be updated. In some embodiments, the checking of the status may help to make sure that a shipment is not exported before the customs authorities release an export, thereby helping to make sure that logistics processes are compliant with all local laws.

At 316, the method may further include receiving a user request for a status of a customs declaration and providing the status of the customs declaration in response to the user request.

Figure 4:
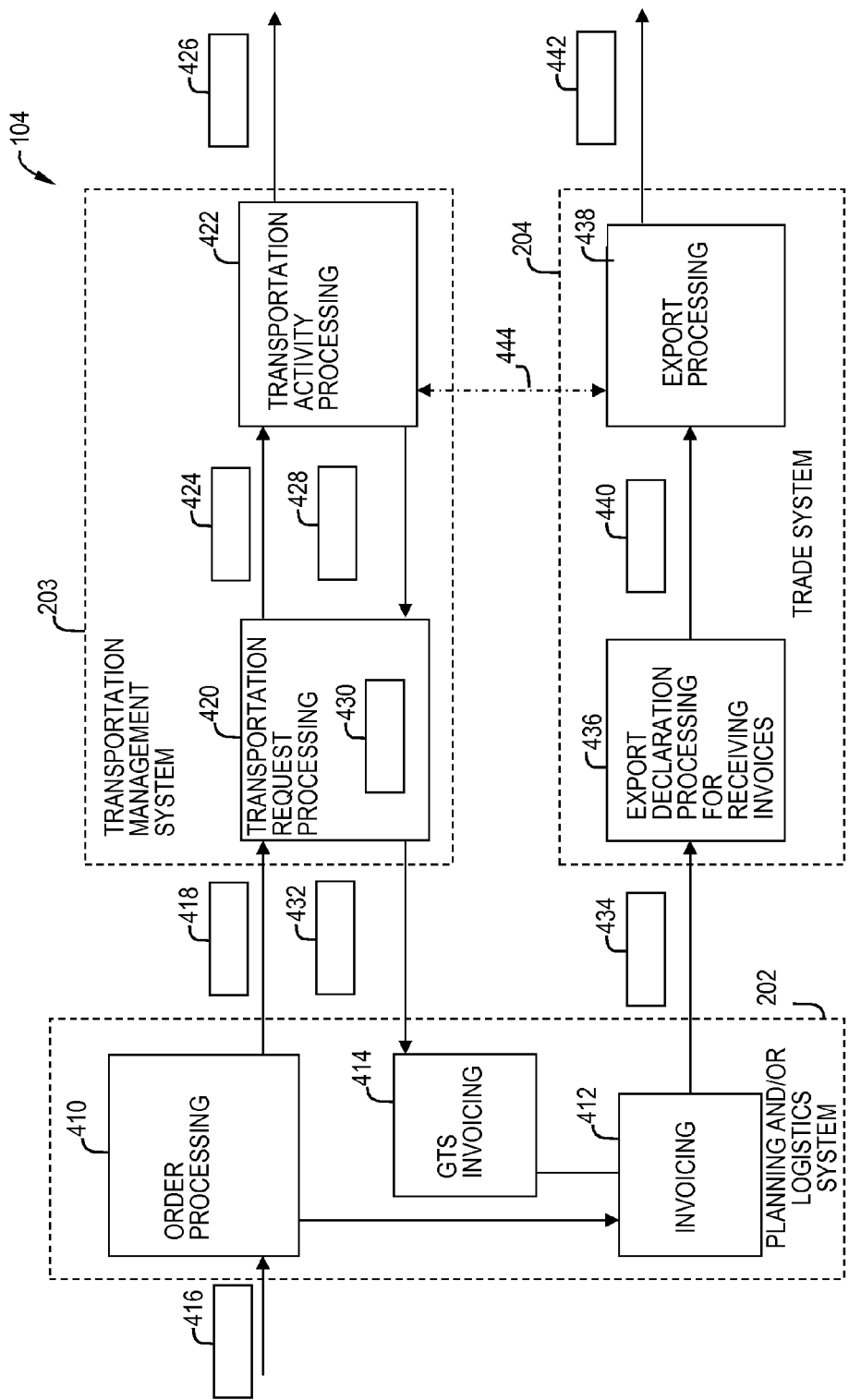
FIG. 4 is a schematic flow diagram of a system, according to some embodiments.

FIG. 4 is a schematic flow diagram illustrating an embodiment of the system 104 performing portions of the method 300 (FIG. 3), in accordance with some embodiments.

Referring to FIG. 4, in some embodiments, a planning and/or logistics system 202 portion of the system 104 comprises an enterprise resource planning (ERP) system, for example an ERP system (e.g., ERP 6.0) provided by SAP AG headquartered in Walldorf, Germany, a transportation management system 203 portion of the system 104 comprises TM 7.0, also provided by SAP AG, and a trade system 204 portion of the system 104 comprises a Global Trade System (GTS), such as for example, GTS 8.0, also provided by SAP AG.

The planning and/or logistics system 202 may include an order processing portion 410 an invoicing portion 412 and a GTS invoicing portion 414. The order processing portion 410 may receive one or more sales order data objects, represented in FIG. 4 by a sales order data object 416, and may generate a plurality of outbound delivery data objects, represented in FIG. 4 by a delivery data object 418, based at least in part thereon. The plurality of outbound delivery data objects 418 may indicate that a plurality of products are ready to be delivered to one or more customers. In some embodiments, the receiving of the one or more sales order data objects 416 triggers the generation of the plurality of outbound delivery data objects 418. In some embodiments, the sales order is any other type of order created in the course of business, such as, a repair order, a fulfillment order, The transportation management system 203 may include a transportation request processing portion 420 and a transportation activity processing portion 422. The transportation request processing portion 420 may receive the plurality of outbound delivery data objects 418 and may generate a plurality of shipment request data objects based at least in part thereon. In some embodiments, the receiving of the plurality of outbound delivery data objects 418, triggers the generation of the plurality of shipment request data objects. In some embodiments, there is a one to one correspondence between the plurality of shipment request data objects 424 and the plurality of outbound delivery data objects 418. In such embodiments, each of the shipment request data objects 424 may be based at least in part on a respective one of the plurality of outbound delivery data objects 418.

In some embodiments, shipment request data objects 424 are not generated unless outbound deliveries (associated with the plurality of outbound delivery data objects 418) are exports and have not been billed. In some embodiments, the at least one shipment request data object is generated only if one or more of outbound deliveries (associated with the plurality of outbound delivery data objects) is for an export and has not been billed. In some embodiments, the at least one shipment request data object is generated only if all of outbound deliveries (associated with the plurality of outbound delivery data objects) are for exports and have not been billed.

The plurality of shipment request data objects 424 may be received by the transportation activity processing portion 422, which may generate one or more planned transportation activity data objects, represented in FIG. 4 by a planned transportation activity data object 426, based at least in part thereon. The transportation activity processing portion 422 may also generate at least one freight unit data objects, represented in FIG. 4 by a freight unit data object 428. In some embodiments, each of the at least one freight unit data objects 428 is associated with a freight unit for shipping and identifies one or more of the products that will be shipped in the associated freight unit. In some embodiments, a single freight unit may include products for more than one customer.

In some embodiments, a freight unit comprises a shipping crate or other type of container and/or structure to receive product(s) to be delivered. In some embodiments, multiple freight units are loaded onto a single ship, train, truck, or other type of vehicle for transporting product(s) to be delivered. In some embodiments, a shipment comprises all of the deliveries being transported on a single vehicle to a single customer. In some embodiments, a delivery comprises all of the products that are on a single order for a single customer. A customer may or may not be an end customer. In some embodiments, a customer comprises a distributor that supplies product(s) to other customers (each of which may or may not be an end customer).

The at least one freight unit data object 428 may be received by the transportation request processing portion 420, which may generate at least one shipment data object, represented in FIG. 4 by a shipment data object 430, based at least in part thereon. In some embodiments, a shipment data object 430 identifies one or more freight units that will be shipped as part of the shipment. In some embodiments, a shipment is to be shipped via a vehicle 110 (FIG. 1).

If a customs export document is to be generated for a shipment, a call may be made (and/or other data sent) 432 to the GTS invoicing portion 414, based at least in part on the shipment data object 430 associated with the shipment. In some embodiments, the call (and/or other data) 432 includes a plurality of unique identifiers that correspond to and/or indicate products that have been combined into the shipment.

The GTS invoicing portion 414 may generate data based at least in part on the call (and/or other data) 432. The invoicing portion 412 may receive the data generated by the GTS invoicing portion 414 and may generate one or more invoices, represented in FIG. 4 by an invoice 434, base at least in part thereon. In some embodiments, each of the one or more invoices 434 comprises a pro forma invoice that is generated in a same mapping and/or manner as used when generating invoices based on one or more outbound delivery data object (e.g., received from the order processing portion). In some embodiments, a plurality of invoices are generated, each invoice being associated with a respective customer and indicating one or more products that the respective customer is to receive from a shipment.

In some embodiments, the system 104 provides a user with a capability to control (to at least some degree) whether particular deliveries or types of deliveries are to be combined into a single invoice and/or separated into multiple invoices. In some embodiments, this capability is provided via a provision of one or more editable parameters or other tools in a graphical or other type of user interface that may be employed by a user to input data that may be used by the system 104 in providing such control. In some embodiments, the planning and/or logistics system 202 and/or the transportation management system 203 has one or more control blocks that receives the user data and/or implements the control. In some embodiments, the capability is provide via a standard split screen criteria tool in a graphical user interface.

The trade system 204 may include an export declaration processing for receiving invoices portion 436 and an export processing portion 438. The export declaration processing for receiving invoices portion 436 may receive the one or more invoices 434 and may generate one or more customs export document, represented by a customs export document 440, based at least thereon. In some embodiments, each customs export document 440 has a one to one correspondence with a respective one of the invoices. Thus, in some embodiments, the trade system generates exactly one customs export document for each invoice 434 supplied thereto. In some embodiments, each customs export document 440 is associated with a respective customer and indicates one or more products that the respective customer is to receive from a shipment. The export processing portion 438 may receive the one or more customs export documents 440 and may generate one or more customs shipment document, represented in FIG. 4 by a customs shipment document 442, based at least thereon.

In some embodiments, the trade system 204 may provide data indicating a status of a customs declaration (e.g., from the transportation management system).

In some embodiments, the trade system 204 allows a user to manually check the status of a customs declaration. In some embodiments, this status update is triggered in the transportation management system 203 and data is transferred from the trade system 204 (directly or indirectly) to the transportation management system. In some embodiments, this status update is manually triggered in the transportation management system. In some embodiments, communication between the transportation management system 203 and the trade system 204 is via a communications link 444. In some embodiments, the system 104 provides a graphical user interface that allows the user to perform this check. In some embodiments, the graphical user interface is used in association with a user device, e.g., user device 120 (FIG. 1). In some embodiments, a shipment status can then be updated. In some embodiments, this may help make sure that a shipment is not exported before the customs authorities release an export, thereby helping to make sure that logistics processes are compliant with all local laws.

In some embodiments, the system 104 removes a block on transport execution (i.e., removes a hold on dispatching a vehicle) as soon as the customs authorities grant the release (e.g., grants a pre-clearance).

In some embodiments, the planning and/or logistics system 202 comprises an enterprise resource planning (ERP) system, for example an ERP system (e.g., ERP 6.0) and a trade system 204 comprises a Global Trade System, such as for example, Global Trade Services (GTS) 8.0, both provided by SAP AG headquartered in Walldorf, Germany. The trade system 204 may be implemented as an Advanced Business Application Programming (ABAP) application within the ERP system. Connection to the transportation management system 203 may be through an Application Programming Interface (API) incorporated into the ERP system and the transportation management system 203 may make remote function calls to the trade system 204. As such, in shipping scenarios involving exporting and trade regulation compliance, the API may include a module which allows a user to create invoices, which are then sent to the trade system 204.

In some embodiments, the system 104 comprises an integration of SAP Global Trade Services (GTS) 8.0 and SAP Transportation Management (TM) 7.0 that helps to simplify invoice creation, export declaration and shipment consolidation. In some embodiments, SAP TM is configured such that a flag is provided on a shipment header to indicate the shipment's relevance for customs.

Some embodiments provide shipment consolidation which allows processing of more than one outbound delivery, as characterized by one or more delivery data objects, e.g., delivery data object 418, to create one trade system 204 relevant billing document.

In some embodiments, in the planning and/or logistics system 202, the invoice is created with input from the transportation management system 203. In some embodiments, the invoice may comprise a report generated by retrieving data from a data source, and processing it in accordance with a schema. The processing can specify consolidating deliveries by customer by shipment. In some embodiments, this invoice may never be presented to the customer it is created to aid export compliance. Within the trade system 204 it is a customs export document, e.g., customs export document 440.

In some embodiments, the at least one shipment data object is generated by a function residing in a separate plug-in for GTS that facilitates integration of an SAP ERP system and an SAP TM system. The plug-in may allow the ERP system to receive data a shipment's content. The ERP system can make use of its customer, production and other data to create documents that can be consumed by GTS. A company's many outbound deliveries, e.g. characterized by the outbound delivery data objects such as object 418 from FIG. 4, may be in one shipment. Each delivery may be related many-to-one to an invoice (i.e., document created in the ERP system) which related one-to-one a customs declaration (i.e., document used in the GTS system). An invoicing system may query the ERP to create one invoice per customer. However, the invoicing system may query the ERP and transport system to create one invoice per customer per shipment. In some embodiments, the shipment information is retrieved via an API in the transport system, e.g., SAP TM. GTS is fed these invoices thus being able to make a consolidated customs declaration for each shipment and customer—automated shipment consolidation.

Figure 5:
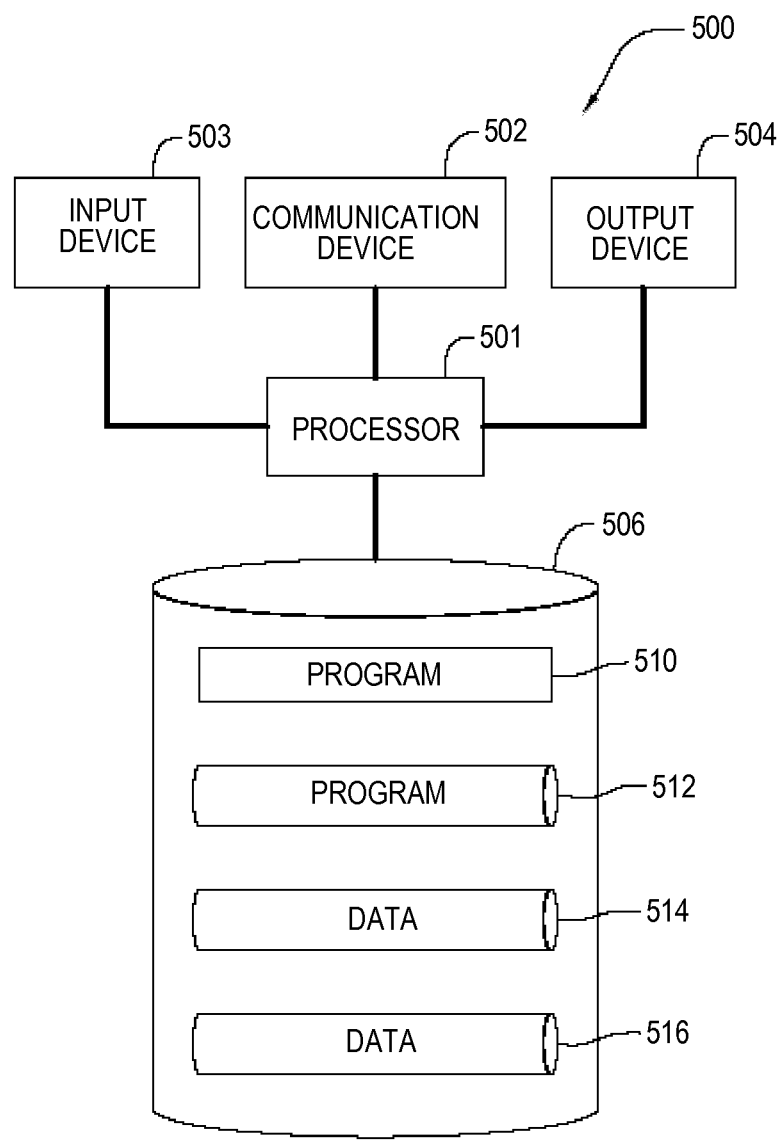
FIG. 5 is a schematic block diagram of an apparatus having an architecture according to some embodiments.

FIG. 5 is a block diagram of an apparatus 500 having an architecture according to some embodiments. In some embodiments, one or more of the systems (or portion(s) thereof) disclosed herein may have an architecture that is the same as and/or similar to the architecture of apparatus 500 (or portion(s) thereof).

Referring to FIG. 5, in accordance with some embodiments, the apparatus 500 includes a processor 501 coupled to a communication device 502, an input device 503, an output device 504 and a storage device 506.

In some embodiments, the processor 501 may execute processor-executable program code to provide one or more portions of one or more functions and/or one or more portions of one or more methods disclosed herein. In some embodiments, the processor 501 may comprise one or more INTEL® Pentium® processors.

The communication device 502 may be used to facilitate communication with other devices and/or systems. In some embodiments, communication device 502 may comprise an Ethernet and/or other type of connection to a network and/or resource and through which apparatus 500 may receive and/or transmit data.

The input device 503 may be used to input data. In some embodiments, the input device 503 may comprise a keyboard, a keypad, a track ball, a touchpad, a mouse or other pointing device, a knob or a switch, a microphone, an infra-red (IR) port and/or a computer media reader.

The output device 504 may be used to output data. In some embodiments, the output device 504 may comprise an IR port, a docking station, a display, a speaker and/or a printer.

The storage device 506 may store one or more programs 510-512 and/or other data for operation of the apparatus 500. In some embodiments, the one or more programs and/or other data may include one or more operating systems, one or more database management systems and/or other applications for operation of the apparatus 500. In some embodiments, the one or more programs 510-512 may include one or more instructions to be executed by the processor 501 to provide one or more portions of one or more functions and/or one or more portions of one or more methods disclosed herein. In some embodiments, the one or more programs and/or other data may include one or more databases 514-516.

In some embodiments, the storage device 506 may comprise one or more storage devices, such as, for example, magnetic storage devices (e.g., magnetic tape and/or hard disk drives), optical storage devices, and/or semiconductor memory devices such as Random Access Memory (RAM) devices and Read Only Memory (ROM) devices.

In some embodiments, one or more portions of one or more embodiments disclosed herein may be embodied in a system, a method, an apparatus and/or a computer-readable storage medium. A computer-readable storage medium may store thereon instructions that when executed by a processor (or multiple processors) result in performance of a process according to any of the embodiments described herein.

Unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

In addition, unless stated otherwise, terms such as, for example, "in response to" and "based on" mean "in response at least to" and "based at least on", respectively, so as not to preclude being responsive to and/or based on, more than one thing.

In addition, unless stated otherwise, data may comprise any type of information and may have and/or be stored in any form. In some embodiments, data may be stored in raw, excerpted, summarized and/or analyzed form.

In addition, unless stated otherwise, a processor may comprise any type of processor. For example, a processor may be programmable or non programmable, general purpose or special purpose, dedicated or non dedicated, distributed or non distributed, shared or not shared, and/or any combination thereof. A processor may include, but is not limited to, hardware, software, firmware, and/or any combination thereof. Hardware may include, but is not limited to off the shelf integrated circuits, custom integrated circuits and/or any combination thereof. In some embodiments, a processor comprises a microprocessor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. A processor may employ continuous signals, periodically sampled signals, and/or any combination thereof. If a processor is distributed, two or more portions of the processor may communicate with one another through a communication link.

In addition, unless stated otherwise, a communication link may be any type of communication link, for example, but not limited to, wired (e.g., conductors, fiber optic cables) or wireless (e.g., acoustic links, electromagnetic links or any combination thereof including, for example, but not limited to microwave links, satellite links, infrared links), and/or combinations thereof, each of which may be public or private, dedicated and/or shared (e.g., a network). A communication link may or may not be a permanent communication link. A communication link may support any type of data in any form, for example, but not limited to, analog and/or digital (e.g., a sequence of binary values, i.e. a bit string) signal(s) in serial and/or in parallel form. The data may or may not be divided into blocks. If divided into blocks, the amount of data in a block may be predetermined or determined dynamically, and/or may be fixed (e.g., uniform) or variable. A communication link may employ a protocol or combination of protocols.

In addition, unless stated otherwise, a "database" may refer to one or more related or unrelated databases.

While various embodiments have been described, such description should not be interpreted in a limiting sense. It is to be understood that other embodiments may be practiced without departing from the spirit and scope of the invention, as recited in the claims appended hereto.

What is claimed is:

1. A non-transitory computer-readable medium having stored thereon processor-executable instructions that when executed by a processor result in the following:

receiving a plurality of outbound delivery data objects indicating that a plurality of products are ready to be delivered to one or more customers;

generating at least one shipment request data object based at least in part on the plurality of outbound delivery data objects;

generating at least one freight unit data object based at least in part on the at least one shipment request data object, each freight unit data object being associated with a freight unit and identifying one or more of the plurality of products to be shipped in the associated freight unit;

generating at least one shipment data object based at least in part on the at least one freight unit data object;

providing, based at least in part on the at least one shipment data object, data indicating that multiple ones of the plurality of products have been combined into a first shipment to a first one of the one or more customers;

generating at least one invoice data object based at least in part on the data indicating that multiple ones of the plurality of products have been combined into the first shipment to the first one of the one or more customers; and generating, based at least in part on the at least one invoice data object, a customs export document that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer.

2. The medium of claim 1, further comprising executable instructions that when executed by a processor result in the following:

receiving at least one sales order data object; and generating the plurality of outbound delivery data objects based at least in part on the at least one sales order data object.

3. The medium of claim 1, wherein each shipment request data object of the at least one shipment request data object is associated with and corresponds to a respective outbound delivery data object of the plurality of outbound delivery data objects.

4. The medium of claim 1, wherein the at least one invoice data object includes an invoice that indicates the multiple ones of the plurality of products that have been combined into the first shipment to the first one of the one or more customers.

5. The medium of claim 1, wherein the at least one invoice data object comprises only one invoice.

6. The medium of claim 1, wherein the at least one invoice data object comprises a plurality of invoices.

7. The medium of claim 1, wherein the generating, based at least in part on the at least one invoice data object, a customs export document that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer, comprises:
generating, based at least in part on the at least one invoice data object, a customs declaration that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer.

8. The medium of claim 1, wherein the generating at least one invoice data object based at least in part on the data indicating that multiple ones of the plurality of products have been combined into the first shipment to the first one of the one or more customers, comprises:
generating a first pro forma invoice based at least in part on the data indicating that multiple ones of the plurality of products have been combined into the first shipment to the first one of the one or more customer; and
wherein the generating, based at least in part on the at least one invoice data object, a customs export document that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer, comprises:
generating, based at least in part on the first pro forma invoice and no other invoice, a customs export document that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer.

9. The medium of claim 1, further comprising executable instructions that when executed by a processor result in the following:
receiving a second plurality of outbound delivery data objects indicating that a second plurality of products are ready to be delivered to one or more customers; and
generating a plurality of pro forma invoices based on the second plurality of outbound delivery data objects that indicate that the second plurality of products are ready to be delivered to one or more customers; and
wherein the generating at least one invoice data object based at least in part on the data indicating that multiple ones of the plurality of products have been combined into the first shipment to the first one of the one or more customers, comprises:
generating at least one pro forma invoice based at least in part on: (i) the data indicating that multiple ones of the plurality of products have been combined into the first shipment to the first one of the one or more customers and (ii) a same mapping that is used to generate the plurality of pro forma invoices based on the second plurality of outbound delivery data objects.

10. The medium of claim 1, further comprising executable instructions that when executed by a processor result in the following:
generating, one or more customs shipment document based at least in part on the customs export document that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer.

11. A method comprising:
receiving, by a processor, a plurality of outbound delivery data objects indicating that a plurality of products are ready to be delivered to one or more customers;
generating, by a processor, at least one shipment request data object based at least in part on the plurality of outbound delivery data objects;
generating, by a processor, at least one freight unit data object based at least in part on the at least one shipment request data object, each freight unit data object being associated with a freight unit and identifying one or more of the plurality of products to be shipped in the associated freight unit;
generating at least one shipment data object based at least in part on the at least one freight unit data object;
providing, by a processor, based at least in part on the at least one shipment data object, data indicating that multiple ones of the plurality of products have been combined into a first shipment to a first one of the one or more customers;
generating, by a processor, at least one invoice data object based at least in part on the data indicating that multiple ones of the plurality of products have been combined into the first shipment to the first one of the one or more customers; and
generating, by a processor, based at least in part on the at least one invoice data object, a customs export document that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer.

12. The method of claim 11, further comprising:
receiving at least one sales order data object; and
generating the plurality of outbound delivery data objects based at least in part on the at least one sales order data object.

13. The method of claim 11, wherein each shipment request data object of the at least one shipment request data object is associated with and corresponds to a respective outbound delivery data object of the plurality of outbound delivery data objects.

14. The method of claim 11, wherein the at least one invoice data object includes an invoice that indicates the multiple ones of the plurality of products that have been combined into the first shipment to the first one of the one or more customers.

15. The method of claim 11, wherein the at least one invoice data object comprises only one invoice.

16. The method of claim 11, wherein the at least one invoice data object comprises a plurality of invoices.

17. The method of claim 11, wherein the generating, based at least in part on the at least one invoice data object, a customs export document that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer, comprises:

generating, based at least in part on the at least one invoice data object, a customs declaration that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer.

18. The method of claim 11, wherein the generating at least one invoice data object based at least in part on the data indicating that multiple ones of the plurality of products have been combined into the first shipment to the first one of the one or more customers, comprises:

generating a first pro forma invoice based at least in part on the data indicating that multiple ones of the plurality of products have been combined into the first shipment to the first one of the one or more customer; and wherein the generating, based at least in part on the at least one invoice data object, a customs export document that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer, comprises:

generating, based at least in part on the first pro forma invoice and no other invoice, a customs export document that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer.

19. The method of claim 11, further comprising:

receiving a second plurality of outbound delivery data objects indicating that a second plurality of products are ready to be delivered to one or more customers; and generating a plurality of pro forma invoices based on the second plurality of outbound delivery data objects that indicate that the second plurality of products are ready to be delivered to one or more customers; and wherein the generating at least one invoice data object based at least in part on the data indicating that multiple ones of the plurality of products have been combined into the first shipment to the first one of the one or more customers, comprises:

generating at least one pro forma invoice based at least in part on: (i) the data indicating that multiple ones of the plurality of products have been combined into the first shipment to the first one of the one or more customers and (ii) a same mapping that is used to generate the plurality of pro forma invoices based on the second plurality of outbound delivery data objects.

20. The method of claim 11, further comprising:

generating, one or more customs shipment document based at least in part on the customs export document that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer.

21. A system comprising:

at least one processor configured to:

receive a plurality of outbound delivery data objects indicating that a plurality of products are ready to be delivered to one or more customers;

generate at least one shipment request data object based at least in part on the plurality of outbound delivery data objects;

generate at least one freight unit data object based at least in part on the at least one shipment request data object, each freight unit data object being associated with a freight unit and identifying one or more of the plurality of products to be shipped in the associated freight unit;

generate at least one shipment data object based at least in part on the at least one freight unit data object;

provide, based at least in part on the at least one shipment data object, data indicating that multiple ones of the plurality of products have been combined into a first shipment to a first one of the one or more customers;

generate at least one invoice data object based at least in part on data indicating that multiple ones of the plurality of products have been combined into the first shipment to the first one of the one or more customers;

generate, based at least in part on the at least one invoice data object, a customs export document that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer.

22. The system of claim 21, wherein the at least one processor is further to:

receive at least one sales order data object; and generate the plurality of outbound delivery data objects based at least in part on the at least one sales order data object.

23. The system of claim 21, wherein each shipment request data object of the at least one shipment request data object is associated with and corresponds to a respective outbound delivery data object of the plurality of outbound delivery data objects.

24. The system of claim 21, wherein the at least one invoice data object includes an invoice that indicates the multiple ones of the plurality of products that have been combined into the first shipment to the first one of the one or more customers.

25. The system of claim 21, wherein the at least one invoice data object comprises only one invoice.

26. The system of claim 21, wherein the at least one invoice data object comprises a plurality of invoices.

27. The system of claim 21, wherein an outbound delivery data object of the plurality of outbound delivery data objects is generated based at least in part on a fulfillment order.

28. The system of claim 21, wherein an outbound delivery data object of the plurality of outbound delivery data objects is generated based at least in part on a repair order.

29. The system of claim 21, wherein the generate, based at least in part on the at least one invoice data object, a customs export document that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer, comprises:
- generate, based at least in part on the at least one invoice data object, a customs declaration that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer.

30. The system of claim 21, wherein the generate at least one invoice data object based at least in part on the data indicating that multiple ones of the plurality of products have been combined into the first shipment to the first one of the one or more customers, comprises:
- generate a first pro forma invoice based at least in part on the data indicating that multiple ones of the plurality of products have been combined into the first shipment to the first one of the one or more customer; and
- wherein the generate, based at least in part on the at least one invoice data object, a customs export document that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer, comprises:
- generate, based at least in part on the first pro forma invoice and no other invoice, a customs export document that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer.

31. The system of claim 21, further comprising at least one processor configured to:
- receive a second plurality of outbound delivery data objects indicating that a second plurality of products are ready to be delivered to one or more customers; and
- generate a plurality of pro forma invoices based on the second plurality of outbound delivery data objects that indicate that the second plurality of products are ready to be delivered to one or more customers; and
- wherein the generate at least one invoice data object based at least in part on the data indicating that multiple ones of the plurality of products have been combined into the first shipment to the first one of the one or more customers, comprises:
- generate at least one pro forma invoice based at least in part on: (i) the data indicating that multiple ones of the plurality of products have been combined into the first shipment to the first one of the one or more customers and (ii) a same mapping that is used to generate the plurality of pro forma invoices based on the second plurality of outbound delivery data objects.

32. The system of claim 21, further comprising at least one processor configured to:
- generate, one or more customs shipment document based at least in part on the customs export document that: (i) indicates that multiple ones of the plurality of products that have been combined into the first shipment to the first one of the one or more customers (ii) is required to export the multiple ones of the plurality of products to the first one of the one or more customers and (iii) is not an invoice to the first customer.

* * * * *